United States Patent [19]

Clarke

[11] Patent Number: 4,798,172
[45] Date of Patent: Jan. 17, 1989

[54] BIRDFEEDER

[75] Inventor: Stephen G. Clarke, Coventry, Conn.

[73] Assignee: Clarke Products Co., Inc., Mansfield Depot, Conn.

[21] Appl. No.: 908,400

[22] Filed: Sep. 16, 1986

Related U.S. Application Data

[63] Continuation-in-part of Ser. No. 860,053, May 6, 1986, abandoned.

[51] Int. Cl.$^4$ .............................................. A01K 39/01
[52] U.S. Cl. ................................................. 119/52 R
[58] Field of Search ............................ 119/51 R, 52 R

[56] References Cited

U.S. PATENT DOCUMENTS

| | | | |
|---|---|---|---|
| 2,195,575 | 4/1940 | Mallgraf | 119/52 |
| 2,683,440 | 7/1954 | Klix | 119/52 R |
| 3,136,296 | 6/1964 | Luin | 119/52 R |
| 3,182,635 | 5/1965 | Waite | 119/51 |
| 3,211,130 | 10/1965 | Prince | 119/51 |
| 3,788,279 | 1/1974 | Boehland, Jr. | 119/52 R |
| 3,919,977 | 11/1975 | Clarke | 119/18 |
| 3,948,220 | 4/1976 | Fiedler | 119/51 R |
| 4,030,451 | 6/1977 | Miller | 119/51 R |
| 4,077,361 | 3/1978 | Thorp | 119/51 R |
| 4,102,308 | 7/1978 | Kilham | 119/52 R |
| 4,201,155 | 5/1980 | Hyde, Jr. | 119/51 R |
| 4,207,839 | 6/1980 | Barry | 119/51 R |
| 4,223,637 | 9/1980 | Keefe | 119/51 R |
| 4,259,927 | 4/1981 | Clarke | 119/51 R |
| 4,331,104 | 5/1982 | Clarke | 119/52 R |

FOREIGN PATENT DOCUMENTS

| | | | |
|---|---|---|---|
| 613603 | 10/1979 | Switzerland | 119/52 R |
| 370308 | 4/1932 | United Kingdom | 119/52 R |

*Primary Examiner*—Robert P. Swiatek

[57] ABSTRACT

A birdfeeder having a body extending along a vertical axis, the body having an axially extending shell having upper and lower wall portions, the upper wall portion having a convexly curved exterior surface extending around the axis and toward the lower portion, an axially extending inner wall inside the shell, the upper wall portion of the shell and the inner wall defining an axially extending reservoir therebetween, the lower wall portion of the shell and the inner wall defining an axially extending chute therebetween, a transversely extending feed tray inside the shell, a portion of the tray extending under a lower edge of the inner wall, the chute communicating between the reservoir and the tray portion, and spacers disposed between the tray portion and the lower edge of the inner wall to maintain a space sufficient to allow seed to pass from the chute into the tray; and an access opening in the lower wall portion of the shell, the access opening communicating between the exterior of the shell and the tray.

16 Claims, 2 Drawing Sheets

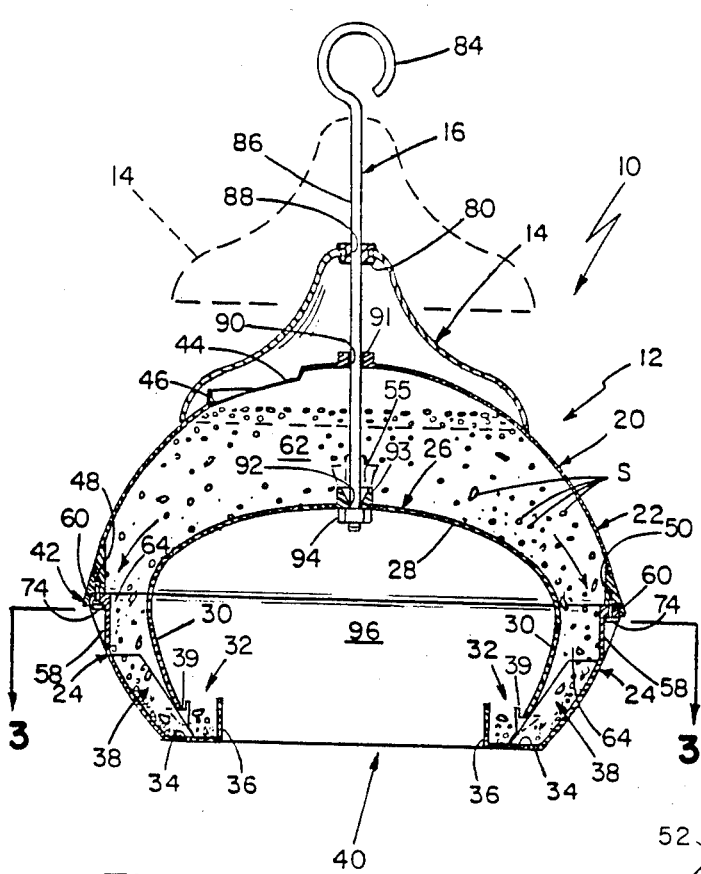
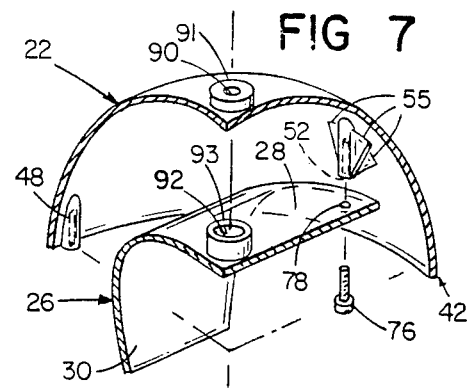
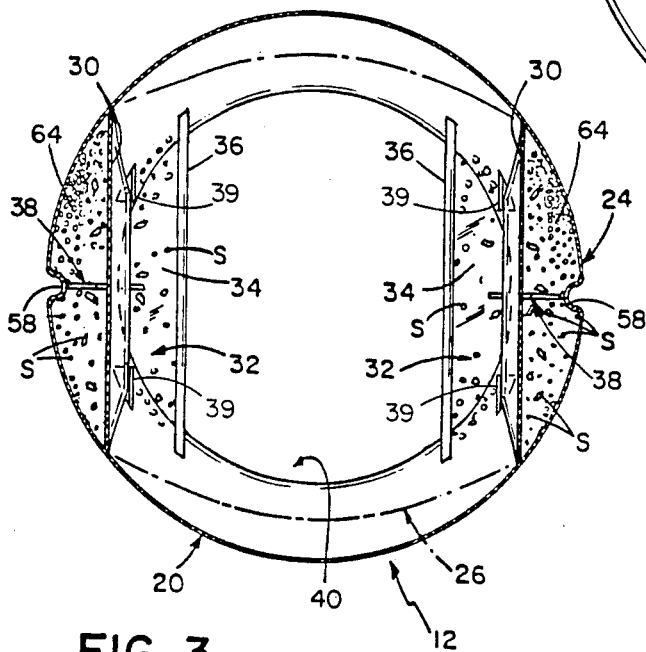
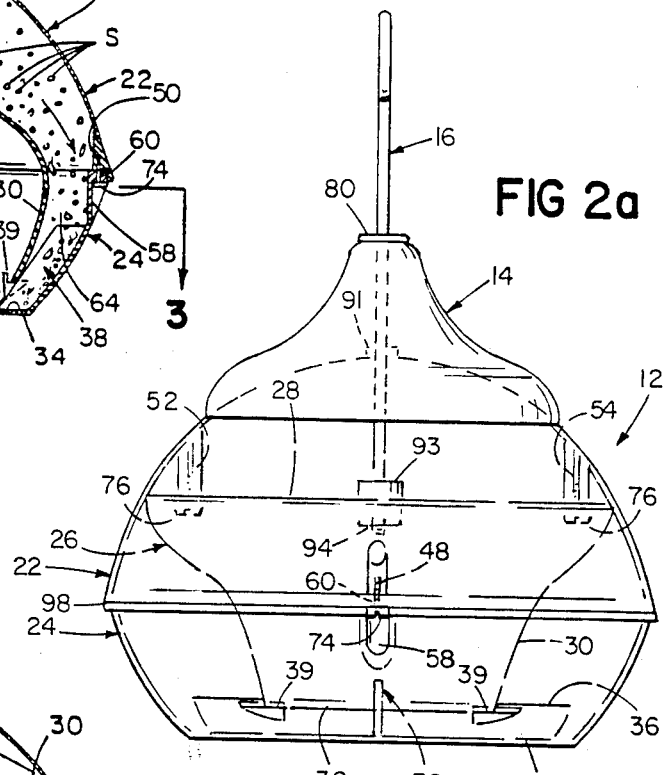
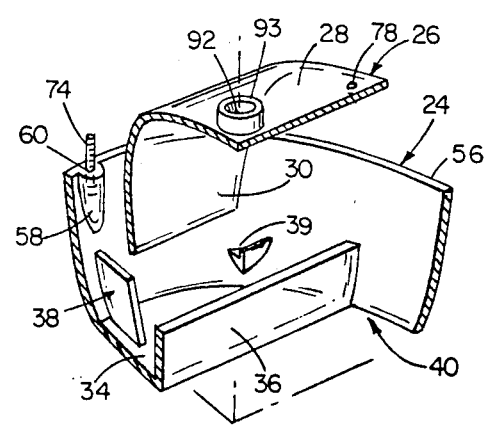

BIRDFEEDER

This application is a continuation-in-part of application Ser. No. 860,053, filed May 6, 1986 and now abandoned.

FIELD OF THE INVENTION

The invention relates to birdfeeders.

BACKGROUND OF THE INVENTION

This invention is an improvement on the birdfeeder described in U.S. Pat. No. 4,331,104.

SUMMARY OF THE INVENTION

In general, the invention features, in one aspect, a birdfeeder having a body extending along a vertical axis, the body having an axially extending shell having upper and lower wall portions, the upper wall portion having a convexly curved exterior surface extending around the axis and toward the lower portion, an axially extending wall means inside the shell, the upper wall portion of the shell and the wall means defining an axially extending reservoir therebetween, the lower wall portion of the shell and the wall means defining an axially extending chute therebetween, a transversely extending feed tray inside the shell, a portion of the tray extending under a lower edge of the wall means, the chute communicating between the reservoir and the tray portion, and spacing means disposed between the tray portion and the lower edge of the wall means to maintain a space sufficient to allow seed to pass from the chute into the tray; and an access opening in the lower wall portion of the shell, the access opening communicating between the exterior of the shell and the tray.

In preferred embodiments, the spacing means is a ledge that supports the lower edge of the wall means; and the tray has a second portion, the tray portions being on opposite sides of the axis, the lower wall portion of the shell and the wall means defining a second axially extending chute communicating between the reservoir and the second portion of the tray, the second portion of the tray extending under a second lower edge of the wall means, and wherein the birdfeeder has a second spacing means disposed between the second tray portion and the second lower edge of the wall means to maintain a space sufficient to allow seed to pass from the second chute into the second tray portion.

The invention features, in another aspect, a birdfeeder having a body extending along a vertical axis, the body having an axially extending shell having upper and lower wall portions, the upper wall portion having a convexly curved exterior surface extending around the axis and toward the lower portion, an axially extending wall means inside the shell, the upper wall portion of the shell and the wall means defining an axially extending reservoir therebetween, the lower wall portion of the shell and the wall means defining an axially extending chute therebetween, a transversely extending feed tray inside the shell, the chute communicating between the reservoir and the tray, and spacing means disposed between an inner surface of the lower wall portion and an outer surface of the wall means to maintain a space sufficient to allow seed to pass through the chute; and an access opening in the lower wall portion of the shell, the access opening communicating between the exterior of the shell and the tray.

In preferred embodiments, the tray has a second portion, the tray portions being on opposite sides of the axis, the lower wall portion of the shell and the wall means defining a second axially extending chute communicating between the reservoir and the second portion of the tray, the second portion of the tray extending under a second lower edge of the wall means, and wherein the birdfeeder has a second spacing means disposed between the inner surface of the lower wall portion and an outer surface of the wall means to maintain a space sufficient to allow seed to pass through the second chute.

The invention features, in another aspect, a birdfeeder having a body extending along a vertical axis, the body having an axially extending shell having upper and lower wall portions, the wall portions intersecting along their peripheries in a manner whereby an upper edge of the lower wall portion engages on an inside surface of the upper wall portion, a lower lip of the upper wall portion extending axially outward of and down over the lower wall portion, the upper wall portion including the lip having a convexly curved exterior surface without projections capable of being gripped by a squirrel when the feeder is in use, an axially extending wall means inside the shell, the upper wall portion of the shell and the wall means defining an axially extending reservoir therebetween, the lower wall portion of the shell and the wall means defining an axially extending chute therebetween, and a transversely extending feed tray inside the shell, the chute communicating between the reservoir and the tray; and an access opening in the lower wall portion of the shell, the access opening communicating between the exterior of the shell and the tray.

In preferred embodiments, the upper and lower wall portions are affixed to each other by means of threaded fasteners; the lower wall portion has a plurality of circumferentially spaced recesses, each recess being rounded and free of projection capable of being gripped by squirrels when the feeder is in use, each recess opening to the exterior of the birdfeeder to provide access to insert the threaded fasteners into the lower wall portion, and wherein the upper wall portion has on its interior a plurality of bores to receive the threaded fasteners, The invention features, in another aspect, a birdfeeder having a body extending along a vertical axis, the body having an axially extending shell having upper and lower wall portions the upper wall portion having a convexly curved exterior surface extending around the axis and toward the lower portion, an axially extending wall means inside the shell, the upper wall portion of the shell and the wall means defining an axially extending reservoir therebetween, the lower wall portion of the shell and the wall means defining an axially extending chute therebetween, a transversely extending feed tray inside the shell, the chute communicating between the reservoir and the tray, and brace means affixed to an inside surface of the upper wall portion to provide support for the upper wall portion; and an access opening in the lower wall portion of the shell, the access opening communicating between the exterior of the shell and the tray.

In preferred embodiments, there are two wall means that are continuations of opposite ends of the brace means, the brace means together with the two wall means forming an arch; the brace means is affixed to the inside surface at spaced points; the brace means and the upper wall portions are affixed to each other by means of threaded fasteners passed through the brace means and into bores on the interior of the upper wall portion.

The invention features, in another aspect, a birdfeeder having a hollow body adapted to receive birdfeed and having a lower portion and an upper portion, the lower portion having a feed access for birds and a resilient region on its underside so that the birdfeeder is resistant to damage from droppage, and the upper portion being configured to preclude access to the lower portion by squirrels from the upper portion and being made of a material sufficiently hard to prevent penetration of the teeth of squirrels.

In preferred embodiments, the body is shell shaped, and the upper and lower portions are distinct pieces, the lower piece being made of a soft material resistant to damage from droppage, the upper piece being made of the hard material. In other preferred embodiments, the upper piece is made of a hard plastic material, and the lower piece is made of a resilient plastic material.

The birdfeeder of the invention has chutes that can accommodate large seed without clogging. The feeder is waterproof; squirrel-proof; and easily and inexpensively manufactured, shipped, and assembled. The feeder has a sturdy top portion that does not readily lose its spherical shape. The feeder is resistant to squirrel bites and is resistant to damage that may be caused, for example, by dropping the feeder.

PREFERRED EMBODIMENTS

The structure and operation of preferred embodiments of the invention will now be described, after first briefly describing the drawings.

Drawings

FIG. 2a is a side elevation of the preferred embodiment.

FIG. 2 is a sectional view at 2—2 of FIG. 1 when the feeder is filled with seed.

FIG. 3 is a sectional view at 3—3 of FIG. 2.

FIG. 7 is an exploded view of cutaway portions of the seed reservoir prior to assembly of the feeder.

FIG. 8 is a similar view of the chute and seed tray.

Structure

Figure 1:
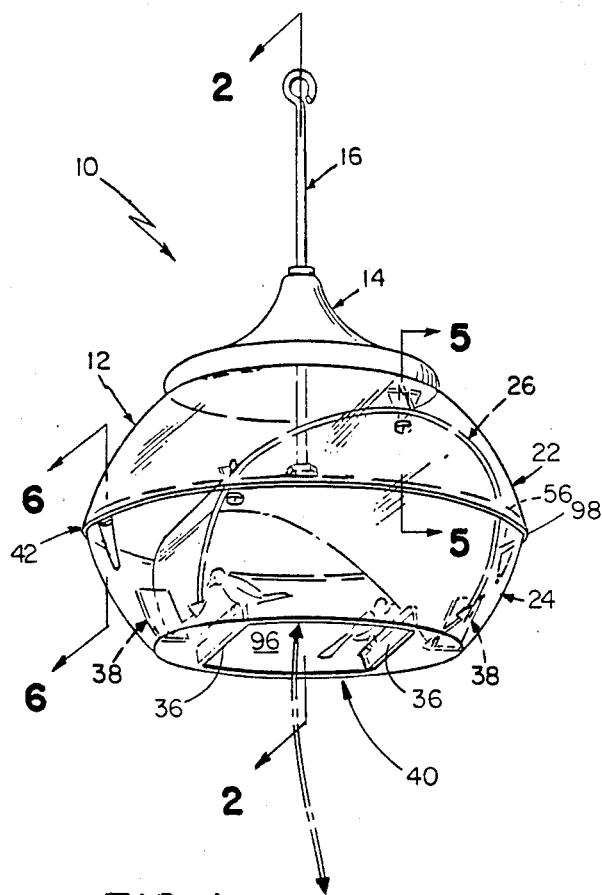
FIG. 1 is a somewhat schematic perspective view of the preferred embodiment.
Figure 5:
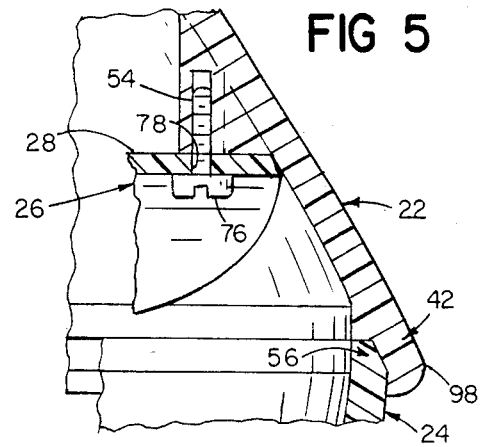
FIG. 5 is a sectional view at 5—5 of FIG. 1.
Figure 4:
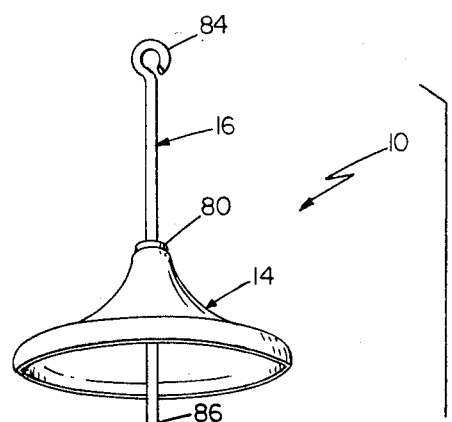
FIG. 4 is an exploded view of the preferred embodiment.
Figure 6:
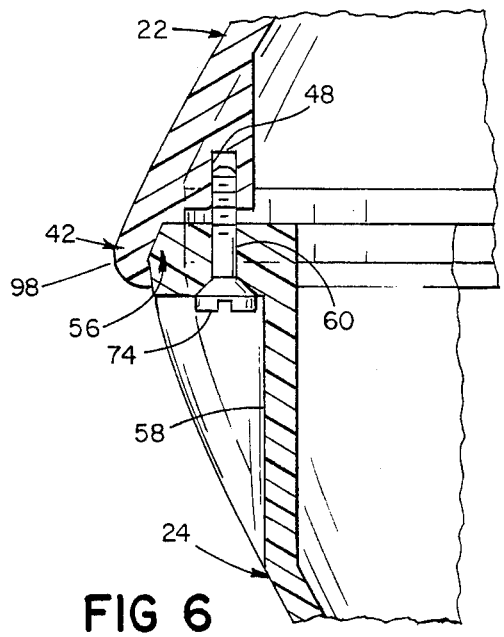
FIG. 6 is a sectional view at 6—6 of FIG. 1.

FIG. 1 shows a birdfeeder 10 having a clear plastic (0.1 inch thick) body 12, a metal (0.0625 inch aluminum) cover 14, and a metal (0.25 inch o.d. plated steel rod) hanger 16.

Referring to FIGS. 2 to 8, body 12 has an outer shell 20 having upper and lower generally spherical (7 inch radius) wall portions 22, 24, an inner arch (6 inches high) 26 having curved brace portion 28 and lower wall portions 30, a pair of seed trays 32, each having floor (1.5 inches wide) and side wall (0.625 inch high) portions 34, 36, a pair of spacer elements 38, four ledges 39, and a bottom access opening (10 inch diameter) 40.

Upper wall portion 22 (5.2 inches high) has outer rounded lip portion 42 and rectangular (4 inches by 2 inches) filling port 44 with lip 46. On the interior of wall portion 22 are posts containing screw receiving bores 48, 50 (0.9 inch deep; 0.125 inch diameter) and 52, 54 (0.75 inch deep; 0.125 inch diameter). Posts 52 and 54 each have three gussets 55 which provide strength. The top of wall portion 22 has hole 90, which is surrounded by knob 91 on the exterior surface.

Lower wall portion 24 (4.2 inches high) has inner lip portion 56 and inward projecting rounded channels 58 (1.9 inches high; 0.5 inch diameter at upper end); at the upper end of the channels are screw holes 60 (0.25 inch deep; 0.125 inch diameter).

The top of inner arch 26 has hole 92, which is surrounded on the upper surface by knob 93.

Wall portion 22 and brace portion 28 define seed reservoir 62. Wall portions 24 and 30 define a pair of seed chutes 64, which communicate between the reservoir and the seed trays.

Spacer elements 38 have edges continuous with trays 32 and wall 24. Ledges 39 extend inwardly from wall 24; the flat surface of each ledge is 0.5 inch above floor portions 34.

Body 12 is made from three molds. The first mold is for upper wall portion 22 (including the posts containing screw receiving bores 48, 50, 52, and 54). The second mold is for a combination of lower wall portion 24, seed trays 32, and spacer elements 38. The third mold is for inner arch 26.

Upper wall portion 22 is made of a hard plexiglass (VO52, available from Rohm and Haas). Lower wall portion 24 is made of a softer plexiglass (MI-7, available from Rohm and Haas) that has good tensile strength. Inner arch 26 is made of Buterate (available from Eastman), a flexible plastic that will not snap when stretched. Thus the underside of the feeder is resilient.

Body 12 is assembled by inserting arch 26 into lower wall portion 24, the lower edges of wall portion 30 resting in slots created by upturned lips on ledges 39 (the opposite ends of each lower edge resting on different ledges, thus preventing rocking of inner arch 26, and the lips preventing the lower edges of wall portion 30 from slipping off ledges 39) and the exterior surface of wall portions 30 resting against spacer elements 38; aligning screw receiving bores 48, 50 with screw receiving bores 60 and snapping upper wall portion 22 over lower wall portion 24; inserting screws 74 (0.7 inch long) from the bottom through channels 58; and inserting screws 76 (0.7 inches long) from the bottom through holes 78 in brace portion 28 into screw holes 52, 54. The inside surface of outer lip portion 42 engages snugly the outer surface of inner lip 56.

Bell-shaped (4.50 inch high, 4.50 inch radius) aluminum cover 14 has a rubber (neoprene) sealing ring or grommet 80.

Hanger 16 has a hook portion 84 and a rod portion 86.

Cover 14 is slidably mounted on body 10 by inserting rod 86 of hanger 16 through hole 88 in the cover and holes 90 and 92 in the body and fastening nut (1 quarter-20 hex nylon) 94 on the threaded end of the rod. Knobs 91 and 93 help guide the rod through holes 90 and 92 during assembly and provide strength to inner arch 26 and upper wall portion 22 at the points of support.

Operation

Reservoir 62 is easily filled by sliding cover 14 up rod 86 (as shown in phantom in FIG. 2), sealing ring 80 providing adequate friction to hold the cover in a raised position, and pouring seed S through port 44. (The very large reservoir holds up to 1 and 1 half gallons of seed.) The seed feeds by gravity from the reservoir through chutes 64 into trays 32. Ledges 39 maintain lower wall portions 30 at a distance from floor portions 34 sufficient to allow large seed (for example, sunflower seeds) to flow from the chutes into the trays without jamming;

spacer elements 38 maintain lower wall portion 30 at a distance from wall portion 24 sufficient to allow large seed to pass through the chutes without jamming. Cover 14 is lowered and the birdfeeder is hung by hook 84 from a tree or other suitable point at least 5 feet from any object that might serve as a platform for squirrels or other such animals to jump up into the feeder. Body 12 rotates about hanger 16 so that the feeder may be oriented to provide the best possible angular position for viewing.

Birds fly upwardly through opening 40 to enclosed feeding area 96. Trays 32 accommodate both clingers (perchers) and ground feeders. Clingers feed from side wall portions 36 and ground feeders stand on floors 34. The wide spacing of the side wall portions promotes maximum exposure of each bird in the feeder for viewing. The long side wall portions' length allows several birds to feed at the same time. However, a bird need not go completely inside the body, because the access opening is positioned sufficiently close to the trays such that a feeding bird may reach the trays without fully entering the shell.

As the birds feed, the seed trays are continually replenished from the reservoir. The enclosed feeding area provides protection for both the seed and the birds from wind and other adverse weather conditions.

The overall geometry of the body makes the feeder squirrel-proof. A squirrel climbing along the top of the feeder is unable to cling to the smooth outwardly curving surfaces of cover 14 and upper wall 22 of outer shell 20. Nor can a squirrel cling to the rounded surfaces of channels 58. Moreover, periphery 98 of shell 20 is far enough away from hanger 16 so that a squirrel on upper wall 22 clinging by its hind legs from the hanger is unable to reach around the shell and into access opening 40. Furthermore, the snug fit between inner lip 56 of lower wall portion 24 and outer lip 42 of upper wall portion 22 leaves no space at the point of joinder of the upper and lower wall portions that can serve as a grip point for squirrels.

The mode of production and assembly also makes the feeder squirrel-proof. Upper and lower wall portions 22, 24 are produced from individual molds and are held together by screws. No glueing together of separate molds is required, and therefore there are no glue seals on the surface of the feeder to which a squirrel can cling to reach into access opening 40.

The seal between upper and lower wall portions 22, 24 is waterproof. Water landing on upper wall portion 22 will run down the side of the feeder and drip off lip 42 without having an opportunity to penetrate the snug fit between lip 56 and lip 42.

Brace portion 28 provides support for upper wall portion 22, making wall portion 22 less flexible (more sturdy) and maintaining the spherical shape of the portion.

The three-mold design of body 12 allows the feeder to fit readily in a conveniently sized box for shipment. The feeder is assembled easily once the box is opened. Moreover, the three-mold design is inexpensive to manufacture.

Squirrels clinging to hanger 16 may attempt to bite upper wall portion 22. The bites do not damage the feeder, however, because the upper wall portion is made of a hard, bite resistant plastic that the teeth of squirrels cannot penetrate.

Sometimes an accident occurs and a feeder is dropped; most of the time, the feeder lands so that lower wall portion 24 strikes the ground. The feeder generally is not damaged by such drops, as the lower wall portion is made of a flexible plastic that has good tensile strength, which makes the lower wall portion impact resistant. The flexible plastic, which is less resistant to squirrel bites than the hard plastic of the upper wall portion, is out of reach of a normal sized squirrel that may cling to hanger 16.

Access opening 40 may be sized to selectively exclude certain types of birds from using the feeder. For example, a 7 inch opening would permit cardinals to enter the feeding area, but prevent access by bluejays.

The clear plastic body not only allows the feeding birds to be observed, but also permits the seed level in the large capacity reservoir to be conveniently monitored. Also, the body is highly resistant to weathering and, in particular, it can be subject to a wide range of temperature without cracking.

ALTERNATE EMBODIMENTS

Other embodiments of the invention are within the following claims. For example, the feeder can have a fly-through access comprising a pair of opposed openings in the lower side of the body. The openings may be sized to selectively exclude bird types. Also, the shape of the shell could be varied. For example, the shell could be cylindrical and have a bell-shaped cover.

What is claimed is:

1. A birdfeeder comprising:
  a body extending along a vertical axis, said body having
    an axially extending shell having upper and lower wall portions, said upper wall portion having a convexly curved exterior surface extending around said axis and toward said lower portion,
    an axially extending wall means inside said shell,
      said upper wall portion of said shell and said wall means defining an axially extending reservoir therebetween,
      said lower wall portion of said shell and said wall means defining an axially extending chute therebetween,
    a transversely extending feed tray inside said shell,
      a portion of said tray extending under a lower edge of said wall means,
      said chute communicating between said reservoir and said tray portion, and
    spacing means disposed between said tray portion and said lower edge of said wall means to maintain a space sufficient to allow seed to pass from said chute into said tray, and
  an access opening in said lower wall portion of said shell, said access opening communicating between the exterior of said shell and said tray.

2. The birdfeeder of claim 1 wherein said body further comprises a second spacing means disposed between an inner surface of said lower wall portion and an outer surface of said wall means to maintain a space sufficient to allow seed to pass through said chute.

3. The birdfeeder of claim 2, wherein said wall portions intersect along their peripheries in a manner whereby an upper edge of said lower wall portion engages on an inside surface of said upper wall portion, a lower lip of said upper wall portion extending axially outward of and down over said lower wall portion, said upper wall portion including said lip having a convexly curved exterior surface without projections capable of being gripped by a squirrel when the feeder is in use.

4. The birdfeeder of claim 1 wherein said spacing means comprises a ledge that supports said lower edge of said wall means.

5. The birdfeeder of claim 1 wherein said tray has a second portion, said tray portions being on opposite sides of said axis, said lower wall portion of said shell and said wall means defining a second axially extending chute communicating between said reservoir and said second portion of said tray, said second portion of said tray extending under a second lower edge of said wall means, and wherein said birdfeeder has a second spacing means disposed between said second tray portion and said second lower edge of said wall means to maintain a space sufficient to allow seed to pass from said second chute into said second tray portion.

6. The birdfeeder of claim 5 wherein said body further comprises
   a third spacing means disposed between an inner surface of said lower wall portion and an outer surface of said wall means to maintain a space sufficient to allow seed to pass through said first chute, and
   a fourth spacing means disposed between an inner surface of said lower wall portion and an outer surface of said wall means to maintain a space sufficient to allow seed to pass through said second chute.

7. The birdfeeder of claim 6 wherein said first and second tray portions are separated by said access opening.

8. A birdfeeder comprising:
   a body extending along a vertical axis, said body having
      an axially extending shell having upper and lower wall portions, said upper wall portion having a convexly curved exterior surface extending around said axis and toward said lower portion,
      an axially extending wall means inside said shell,
         said upper wall portion of said shell and said wall means defining an axially extending reservoir therebetween,
         said lower wall portion of said shell and said wall means defining an axially extending chute therebetween,
      a transversely extending feed tray inside said shell, said chute communicating between said reservoir and said tray, and
      spacing means disposed between an inner surface of said lower wall portion and an outer surface of said wall means to maintain a space sufficient to allow seed to pass through said chute, and
      an access opening in said lower wall portion of said shell, said access opening communicating between the exterior of said shell and said tray.

9. The birdfeeder of claim 8 wherein said tray has a second portion, said tray portions being on opposite sides of said axis, said lower wall portion of said shell and said wall means defining a second axially extending chute communicating between said reservoir and said second portion of said tray, said second portion of said tray extending under a second lower edge of said wall means, and wherein said birdfeeder has a second spacing means disposed between said inner surface of said lower wall portion and an outer surface of said wall means to maintain a space sufficient to allow seed to pass through said second chute.

10. A birdfeeder comprising:
    a body extending along a vertical axis, said body having
       an axially extending shell having upper and lower wall portions, said wall portions intersecting along their peripheries in a manner whereby an upper edge of said lower wall portion engages on an inside surface of said upper wall portion, a lower lip of said upper wall portion extending axially outward of and down over said lower wall portion, said upper wall portion including said lip having a convexly curved exterior surface without projections capable of being gripped by a squirrel when said birdfeeder is in use,
       an axially extending wall means inside said shell,
          said upper wall portion of said shell and said wall means defining an axially extending reservoir therebetween,
          said lower wall portion of said shell and said wall means defining an axially extending chute therebetween,
       a transversely extending feed tray inside said shell, said chute communicating between said reservoir and said tray, and
       an access opening in said lower wall portion of said shell, said access opening communicating between the exterior of said shell and said tray.

11. The birdfeeder of claim 10 wherein said upper and lower wall portions are affixed to each other by means of threaded fasteners.

12. The birdfeeder of claim 11 wherein said lower wall portion has a plurality of circumferentially spaced recesses, each said recess opening to the exterior of said birdfeeder to provide access to insert said threaded fasteners into said lower wall portion; and wherein said upper wall portion has on its interior a plurality of bores to receive said threaded fasteners.

13. The birdfeeder of claim 12 wherein said recesses are rounded and free of projection capable of being gripped by squirrels when said feeder is in use.

14. A birdfeeder comprising:
    a body extending along a vertical axis, said body having
       an axially extending shell having upper and lower wall portions, said upper wall portion having a convexly curved exterior surface extending around said axis and toward said lower portion,
       an axially extending wall means inside said shell,
          said upper wall portion of said shell and said wall means defining an axially extending reservoir therebetween, said upper wall portion being the outer wall of said reservoir and said wall means being the inner wall of said reservoir,
          said lower wall portion of said shell and said wall means defining an axially extending chute therebetween, said lower wall portion being the outer wall of said chute and said wall means being the inner wall of said chute,
          said wall means being affixed to an inside surface of said upper wall portion to provide a brace for said upper wall portion,
       a transversely extending feed tray inside said shell, said chute communicating between said reservoir and said tray, and
       an access opening in said lower wall portion of said shell, said access opening communicating between the exterior of said shell and said tray.

15. The birdfeeder of claim 14 wherein said brace is affixed to said inside surface at spaced points on said inside surface.

16. The birdfeeder of claim 14 wherein said brace and said upper wall portion are affixed to each other by means of threaded fasteners passed through said brace and into bores on the interior surface of said upper wall portion.

* * * * *